United States Patent
Foerg et al.

(10) Patent No.: US 11,987,217 B2
(45) Date of Patent: May 21, 2024

(54) METHOD AND APPARATUS FOR TREATING A VEHICLE HAVING AT LEAST ONE OUTER SURFACE

(71) Applicant: WashTec Holding GmbH, Augsburg (DE)

(72) Inventors: Oliver Foerg, Augsburg (DE); Bernhard Heinz, Gersthofen (DE); David Stecher, Monheim (DE)

(73) Assignee: Washtec Holding GmbH, Augsburg (DE)

( * ) Notice: Subject to any disclaimer, the term of this patent is extended or adjusted under 35 U.S.C. 154(b) by 0 days.

(21) Appl. No.: 17/704,546

(22) Filed: Mar. 25, 2022

(65) Prior Publication Data
US 2022/0212636 A1    Jul. 7, 2022

Related U.S. Application Data

(63) Continuation of application No. PCT/EP2020/075463, filed on Sep. 11, 2020.

(30) Foreign Application Priority Data

Sep. 25, 2019 (DE) .................. 10 2019 125 785.9

(51) Int. Cl.
*B60S 3/06* (2006.01)
(52) U.S. Cl.
CPC ............... *B60S 3/063* (2013.01); *B60S 3/06* (2013.01); *B60S 3/066* (2013.01)
(58) Field of Classification Search
CPC ...................... B60S 3/00; B60S 3/06
See application file for complete search history.

(56) References Cited

U.S. PATENT DOCUMENTS 3,500,488 A * 3/1970 Grant ............... B60S 3/063
                                                    15/DIG. 2
3,588,935 A * 6/1971 Anttila .............. B60S 3/063
                                                    15/53.2
(Continued)

FOREIGN PATENT DOCUMENTS

| CN | 101767574 A | 7/2010 |
| CN | 103097211 A | 5/2013 |

(Continued)

OTHER PUBLICATIONS

Hirschmann et al. ;Oct. 2017; and Attached English Translation for DE2017116174, to.*

(Continued)

*Primary Examiner* — Michael D Jennings
(74) *Attorney, Agent, or Firm* — Ewers IP Law PLLC; Falk Ewers

(57) ABSTRACT

A method for treating a vehicle having at least one outer surface, includes (a) adjusting an angle of a treatment brush relative to the vertical in at least one predetermined angular range parallel and/or perpendicular to the outer surface, (b) guiding the treatment brush along the at least one outer surface on a path during the treatment process, (c) monitoring the angle of the treatment brush to the vertical parallel and/or perpendicular to the outer surface during step (b), and (d) adapting the path of the treatment brush if a deviation of the monitored angle of the treatment brush from the at least one predetermined angular range is determined in step (c). An apparatus for treating a vehicle having at least one outer surface, a use of the apparatus for treating a vehicle having at least one outer surface, and a computer program product are further disclosed.

16 Claims, 4 Drawing Sheets

(56) References Cited

U.S. PATENT DOCUMENTS

| | | | | |
|---|---|---|---|---|
| 3,662,419 | A * | 5/1972 | Dini | B60S 3/063 15/53.2 |
| 3,793,667 | A * | 2/1974 | Capra | B60S 3/06 15/53.2 |
| 3,818,530 | A * | 6/1974 | Takeuchi | B60S 3/063 15/DIG. 2 |
| 3,926,663 | A * | 12/1975 | Gray | B60S 3/063 134/32 |
| 4,118,820 | A * | 10/1978 | Bivens | B60S 3/06 15/DIG. 2 |
| 4,270,958 | A * | 6/1981 | Ennis | B60S 3/063 134/6 |
| 4,332,625 | A * | 6/1982 | Ennis | B60S 3/063 134/6 |
| 4,470,167 | A * | 9/1984 | Bivens | B60S 3/06 15/DIG. 2 |
| 4,593,425 | A * | 6/1986 | Bivens | B60S 3/06 15/53.2 |
| 5,177,825 | A * | 1/1993 | Belanger | B60S 3/063 15/4 |
| 10,994,705 | B2 | 5/2021 | Auer et al. | |
| 2004/0237232 | A1 * | 12/2004 | Ennis | B60S 3/063 15/53.2 |
| 2013/0220369 | A1 | 8/2013 | Wimmer | |
| 2015/0274137 | A1 * | 10/2015 | Belanger | A46B 13/008 15/53.1 |
| 2019/0072247 | A1 * | 3/2019 | Wentworth | F21S 8/032 |
| 2019/0329738 | A1 * | 10/2019 | Wilson | B60S 3/002 |
| 2020/0148176 | A1 | 5/2020 | Hirschmann et al. | |
| 2020/0198593 | A1 * | 6/2020 | Schmalzel, Jr. | B60S 3/06 |

FOREIGN PATENT DOCUMENTS

| | | |
|---|---|---|
| CN | 107539291 A | 1/2018 |
| CN | 107878410 A | 4/2018 |
| DE | 102014112388 A1 | 3/2016 |
| DE | 102017116174 A1 | 1/2019 |
| EP | 3437942 A1 | 2/2019 |
| JP | 2012148733 A | 8/2012 |

OTHER PUBLICATIONS

Preliminary Report on Patentability dated Mar. 15, 2022 of international application PCT/EP2020/075463 on which this application is based and English-language translation thereof.

Search Report of the German Patent and Trademark Office dated Jan. 26, 2021 (Priority Application No. DE 10 2019 125 785.9) and English-language translation thereof.

Office Action dated May 23, 2023, issued in Chinese counterpart application No. 202080066798.3 and English-language translation thereof.

Office Action dated Sep. 19, 2023 European counterpart application No. EP 20 771 830.5 and English-language translation thereof.

* cited by examiner

METHOD AND APPARATUS FOR TREATING A VEHICLE HAVING AT LEAST ONE OUTER SURFACE

CROSS REFERENCE TO RELATED APPLICATIONS

This application is a continuation application of international patent application PCT/EP2020/075463, filed Sep. 11, 2020, designating the United States and claiming priority to German application 10 2019 125 785.9, filed Sep. 25, 2019, and the entire content of both applications is incorporated herein by reference.

TECHNICAL FIELD

The present disclosure relates to a method and apparatus for treating a vehicle having at least one outer surface, a use of the apparatus for treating a vehicle having at least one outer surface, and a computer program product.

BACKGROUND

In vehicle washing systems, such as gantry car washes or car washes, the surfaces of the vehicle are typically cleaned with, e.g., rotating, washing brushes, which are guided along the surfaces on predefined paths. In this process, protruding attachments on the vehicle are taken into account by global strategies in order to avoid collisions or damage to the vehicle and/or the washing brush. One example is a bypass of side mirrors, in which the washing brush is locked in the vertical position in the forward stroke, and in the return stroke the washing brush is positioned against the vehicle, but is straightened again from approximately the middle of the vehicle in order to protect the side mirror from damage. The straight position of the washing brush is only realized depending on the vehicle length, e.g., from the middle of the vehicle, and a fixed time for a move away from the vehicle. As a result, however, the areas behind the side mirror are not always optimally cleaned. Global strategies are typically used for vehicle contours that can be generalized to any vehicle.

If there are unusual add-on parts on the vehicle or special contours, special sequences of the vehicle washing process must typically be initiated, e.g., by selecting a special program. Here, for example, the pickup or roof box program should be mentioned. Roof boxes can be driven under in the area of the windshield and torn out of their anchorage by the lifting motion of the roof brush. This geometry cannot be treated with a rigidly mounted roof brush and a fixed program without a special sequence.

Further, the typical vehicle washing process is inflexible with respect to changing vehicle contours or positions, such as when the vehicle rolls away, a tailgate or a side door opens. Likewise, disturbances in the washing process can cause vibrations in the machine's mechanical system that make a normal wash cycle impossible.

SUMMARY

It is an object of the disclosure to provide a device and a method for treating a vehicle which enable a thorough treatment result as well as a high level of operational safety and avoidance of vehicle damage.

This object is achieved by a method and an apparatus for treating a vehicle, and a computer program product as described herein.

A first embodiment of the disclosure relates to a method for treating, in particular cleaning, a vehicle having at least one external surface, comprising a) setting an angle of a treatment brush, in particular a rotating treatment brush, relative to the vertical in at least one predetermined angular range parallel and/or perpendicular to the external surface; b) guiding the treatment brush along the at least one outer surface on a path during the treatment process; c) monitoring the angle of the treatment brush to the vertical parallel and/or perpendicular to the outer surface during step b); and d) adapting the path of the treatment brush if a deviation of the monitored angle of the treatment brush from the at least one predetermined angular range is determined in step c).

By monitoring the angle of the treatment brush during the treatment process, the method of the above embodiment enables unforeseen and/or undesirable situations or vehicle contours to be detected automatically and counteracted automatically with appropriate special sequences. Thus, the process allows the treatment brush to be guided along a path that is adapted to the entire outer contour of the vehicle. This results in a particularly thorough treatment of the vehicle. At the same time, the method allows a safe approach of the brush to the vehicle to be maintained during treatment. In addition, the device can be used to counteract undesirable oscillation of the brush by detecting even small deviations of the angle of the treatment brush from the predetermined angle range and adapting the path of the treatment brush. Therefore, operational safety during the vehicle treatment process is increased and vehicle damage is avoided.

In particular, monitoring the treatment process based on the angle of the treatment brush to the vertical is much more sensitive than previous monitoring measures, especially more sensitive compared to monitoring based on the power consumption of the brush drive or the rotation of the brush. In addition, monitoring the treatment process on the basis of the angle of the treatment brush to the vertical allows the path of the treatment brush to be adapted much more quickly than with monitoring on the basis of the power consumption of the brush drive or the rotation of the brush. The latter monitoring measures show a relatively large dead time, i.e., a long period of time in which an already existing disturbance or deviation from the desired treatment process is not detected. With the monitoring of the treatment process on the basis of the angle of the treatment brush to the vertical, on the other hand, an unusual deflection of the brush is already detected before the brush is blocked by, for example, snagging on the vehicle or collides with or damages the vehicle due to an unusual vehicle contour or positional displacement of the vehicle. This is based on the fact that the material of the treatment brush is in contact with the vehicle when approached first or continuously during the treatment process, so that unusual situations very quickly affect the orientation of the brush to the vertical.

In embodiments of the method, the angle of the treatment brush can be adjusted in step a) while providing a pivotability of the treatment brush. For example, a pivotability, also called residual free pivotability, of at least +/−5°, typically at least +/−1°, more typically at least +/−0.5°, can be provided. In the case of a substantially rigidly suspended treatment brush, the residual free pivotability may be at least +/−1°. In the case of a substantially freely oscillating or freely pendulum suspended treatment brush, a residual free pivotability of at least +/−5 can be provided. The sequence of steps a) to c), where c) is associated with d), may be varied in embodiments. The treatment brush may further rotate at least during or in the course of the treatment process. Furthermore, when a deviation is determined in step c), the data of the position of the deviation on the outer surface may be determined.

Adapting the path may comprise at least one step selected from i) repeating at least one of steps a) to d); ii) repeating at least one of steps a) to d) with a modified distance of the treatment brush to the outer surface; iii) repeating at least one of steps a) to d) with a modified angle of the treatment brush to the vertical parallel and/or perpendicular to the outer surface; iv) repeating at least step b) of steps a) to d), wherein in step b) a change of direction is made while guiding along; v) driving around a contour of the outer surface causing the deviation of the monitored angle; vi) increasing the distance of the treatment brush to the outer surface; vii) separating the treatment brush from the vehicle; viii) terminating a rotation of the treatment brush; ix) treating a contour of the outer surface causing the deviation of the monitored angle with at least one other treatment brush; x) changing the direction of rotation of the treatment brush; xi) varying the sensitivity of the power measurement, in particular increasing the sensitivity of the power measurement; and xii) checking the feasibility of at least one of steps i) to xi) and interrupting or terminating the treatment process if it is determined that the at least one step i) to xi) is not feasible.

In step iv), the change of direction can be made at the beginning, at the end or while the treatment brush is moving along the outer surface. In steps i) to v), steps b) to d) in particular or only can be repeated. Steps i) to x) are in each case measures with which a disturbance or deviation from the desired treatment process can be counteracted in a highly flexible and timely manner by guiding the brush along an appropriately adapted path.

In embodiments of the method, the treatment brush may be moved along the at least one outer surface on one or more adapted paths until at least one of the following conditions is met: the monitored angle of the treatment brush is within the at least one predetermined angular range; the path of the treatment brush has been adapted a predetermined number of times; and the treatment brush has been moved along the outer surface on one or more adapted paths for a predetermined time. In this way, it can be achieved that the adaptation of the path is carried out only as long as necessary, i.e., as long as the disturbance or deviation from the desired angle of the treatment brush to the vertical.

The at least one outer surface may be selected from a side surface, a rear surface, a front surface, a roof surface, any combination thereof, and any number thereof, and the at least one predetermined angular range may be limited by an upper limit value and/or a lower limit value that varies depending on the type of outer surface. Further, the at least one outer surface may be selected from a side surface, a rear surface, a front surface, any combination thereof, and any number thereof, and the at least one predetermined angular range may be limited by an upper limit value and/or a lower limit value that varies depending on the height of the outer surface. These specific limit values allow the sensitivity of the monitoring of step c) to be set and varied, for example, depending on the type and/or height of the external surface or on the type of vehicle.

Further, the at least one outer surface may be selected from a side surface, a rear surface, a front surface, any combination thereof, and any number thereof, and the at least one predetermined angular range may be −45° to +45° from vertical. In particular, for an inclination of the treatment brush toward the outer surface, the at least one predetermined angular range may typically be −10° to +30° from the vertical, more typically −5° to +30° from the vertical. Further, the at least one outer surface may be a roof surface and the at least one predetermined angular range may be −85° to +85°, more typically −80° to +80, to the vertical.

In further embodiments, step c) can be carried out using an angle sensor or a tilt sensor. This has the advantage that the orientation of the treatment brush to the vertical can be monitored intermittently or continuously during the treatment process. In embodiments, a combined acceleration-rotation sensor or a combination of gyroscope and acceleration sensor can be used as tilt sensor. Advantageously, these operate unaffected by vibrations.

The angle sensor can comprise a magnet and a magnetic field sensor. This has the advantage that the function of the angle sensor is not dependent on temperature and humidity, is not sensitive to vibrations, and cannot be influenced by water pressure. The same applies when using an inclination sensor. The angle sensor can be arranged at least partially on an axis corresponding to the angle of the treatment brush to the vertical, e.g., on an inclination axis specifying the angle of inclination of the brush. This allows the orientation of the treatment brush to the vertical to be determined accurately. In particular, the axis or tilt axis may correspond to a pivot axis of the brush with which the angle of the treatment brush is adjusted. Further, the magnet may be located remotely from the magnetic field sensor on the tilt axis of the brush. The determination of the angle of the cleaning brush can thus be carried out continuously with particularly high accuracy. Furthermore, a change in the orientation of the magnetic field of a magnet can be determined in step c). The angle sensor can alternatively be designed as a laser angle sensor, in which a laser beam is deflected at a reflective surface that is aligned according to the orientation of the brush.

According to other embodiments, the contour and/or position of the outer surface can be determined in the process. Light barriers can be used for this purpose, for example. Further, the treatment brush may rotate, particularly in step b). Step c) may comprise at least one step selected from: Monitoring the power consumption of the rotating treatment brush and monitoring the rotation of the rotating treatment brush.

A further embodiment of the disclosure relates to a device for treating, in particular cleaning, a vehicle having at least one outer surface with a method according to one of the above embodiments, comprising at least one treatment brush which can be guided along the at least one outer surface on a track; a brush traversing device for guiding the treatment brush along the outer surface to be treated on the track; means for adjusting an angle of the treatment brush relative to the vertical in at least one predetermined angular range parallel and/or perpendicular to the outer surface; means for monitoring the angle of the treatment brush to the vertical parallel and/or perpendicular to the outer surface during the treatment process; and means for adapting the path of the treatment brush when the monitored angle of the treatment brush deviates from the at least one predetermined angular range. The treatment brush may be provided to be rotatable. The apparatus may be a gantry treatment system or a vehicle treatment line.

The treatment brush may be rotatably supported and the apparatus may comprise a brush rotation drive. The device for adapting the path of the treatment brush may be or comprise a data-processing storage and control unit which is connected in a data-conducting manner to at least one device selected from the brush traversing device, the brush rotation drive, the device for setting an angle of the treatment brush and the device for monitoring the angle of the treatment brush, which is designed to store data received from these devices and which is designed to control the method according to one of the above embodiments. The brush traversing device may be adapted to determine and/or transmit to the storage and control unit the data of the position at the outer surface at which the monitored angle of the treatment brush deviates from the at least one predetermined angular range.

At least one element selected from the treatment brush, the brush traversing device and the brush rotation drive can be controllable with the device for adapting the path of the treatment brush, in particular with the memory and control unit. Furthermore, a program, in particular a computer program, can be implemented in the device for adapting the path of the treatment brush, in particular in the memory and control unit, which is designed to cause the device to execute a method according to one of the above embodiments.

The at least one outer surface may be selected from a side surface, a rear surface, a front surface, a roof surface, any combination thereof, and any number thereof, and the at least one predetermined angular range may be limited by an upper limit value and/or a lower limit value that varies depending on the type of outer surface. The at least one outer surface may be selected from a side surface, a rear surface, a front surface, any combination thereof, and any number thereof, and the at least one predetermined angular range may be limited by an upper limit value and/or a lower limit value that varies depending on the height of the outer surface.

In the foregoing embodiments, the at least one outer surface may be selected from a side surface, a rear surface, a front surface, any combination thereof, and any number thereof, and the at least one predetermined angular range may be −45° to +45° from vertical. In particular, for an inclination of the treatment brush toward the outer surface, the at least one predetermined angular range may typically be −10° to +30° from the vertical, more typically −5° to +30° from the vertical. Further, the at least one outer surface may be a roof surface and the at least one predetermined angular range may be −85° to +85°, more typically −80° to +80, to the vertical.

The means for monitoring the angle of the treatment brush may include an angle sensor or an inclination sensor. In embodiments, a combined acceleration-rotation sensor or a combination of gyroscope and acceleration sensor may be used as tilt sensor. Advantageously, these operate unaffected by vibrations.

The angle sensor can comprise a magnet and a magnetic field sensor. The angle sensor can be arranged at least partially on an axis corresponding to the angle of the treatment brush to the vertical, e.g., on an inclination axis specifying the angle of inclination of the brush. In particular, the axis or tilt axis may correspond to a pivot axis of the brush with which the angle of the treatment brush is adjusted. Further, the magnet may be disposed remotely from the magnetic field sensor on the tilt axis of the brush. The angle sensor may further be configured to detect a change in orientation of the magnetic field of a magnet.

The apparatus may further comprise at least one element selected from: means for monitoring power consumption of the rotating treatment brush; means for monitoring rotation of the rotating treatment brush; and means for determining the contour and/or position of the outer surface.

The foregoing embodiments of the apparatus may include corresponding modifications as the embodiments of the method for treating a vehicle explained above, and may enable the same beneficial effects as the embodiments of the method with corresponding or analogous features explained above.

Another embodiment of the disclosure relates to a use of an apparatus according to any one of the preceding embodiments for carrying out a method according to any one of the preceding embodiments.

An additional embodiment of the disclosure discloses a computer program product or computer program comprising program elements that cause an execution unit, in particular a vehicle treatment system or an apparatus according to any of the preceding embodiments, to execute the method according to any of the preceding embodiments when the program elements are loaded into a memory of the execution unit, in particular into the memory and control unit of the apparatus according to any of the preceding embodiments, or into a memory of a server or computer in data-conducting communication with the execution unit. Embodiments provide a corresponding computer program and/or a computer-readable medium on which the computer program is stored. The server and/or computer may be wired or wirelessly connected to and/or integrated with the vehicle treatment unit.

In the aforementioned embodiments of the vehicle treatment system and/or the computer program product and/or the computer program, corresponding modifications may be implemented as in the embodiments of the method for operating a vehicle treatment system explained above, and these may enable the same beneficial effects as the embodiments of the method with corresponding features explained above.

BRIEF DESCRIPTION OF THE DRAWINGS

The disclosure will now be described with reference to the drawings wherein.

DESCRIPTION OF EXEMPLARY EMBODIMENTS

Figure 1:
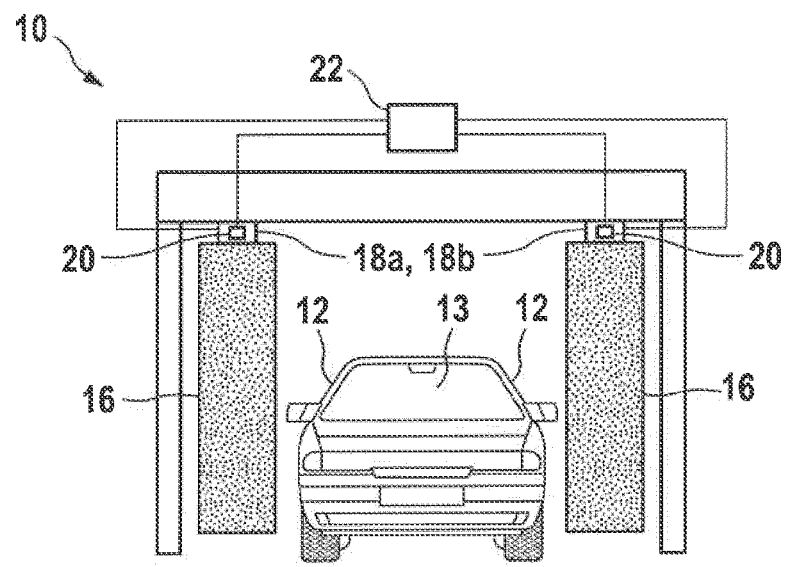
FIG. 1 shows schematically an apparatus after the vehicle has been retracted according to an exemplary embodiment of the disclosure.

In the following detailed description of the figures, further exemplary embodiments, which are not to be understood as restrictive, are explained with their features and further advantages on the basis of the figures. All the features or process steps of embodiments and examples described here, which are not mutually exclusive, can be combined with one another. Identical elements of the embodiments are provided with the same reference signs in the following description. Elements of one embodiment may be used in the other embodiments without further mention.

The term "adapting" includes modifying the path of the treatment brush, e.g., modifying a path predetermined by a spatial specification and optionally a temporal specification. For example, the trajectory may be or become predetermined by a treatment program that is determined prior to the start of the treatment process, e.g., after input or determination of the vehicle type and/or after initial contour detection of the vehicle. For example, as viewed from above the roof surface, the path may be substantially parallel to the side and/or rear surface to be treated. The term "adapting" may include controlling and/or regulating in which the path of the treatment brush is modified. In this context, at least one element selected from the treatment brush, the brush traversing device and the brush rotation drive may be controlled or controllable, in particular with the device for adapting the path of the treatment brush.

"Angle of the treatment brush parallel and/or perpendicular to the outer surface" or "angle of the treatment brush in an angular range parallel and/or perpendicular to the outer surface" means in the present case that the treatment brush can be/be oriented at least partially at an angle lying in a plane substantially parallel to the outer surface or in a plane enclosing an angle of more than 0° to less than 180° with the outer surface.

The term "bypassing" includes advancing the treatment brush along a path adapted such that the treatment brush is in contact with the outer surface and/or with the contour of the outer surface causing the deviation of the monitored angle at an increased distance. The term "bypassing" further includes a further guidance of the treatment brush on such an adapted path that the treatment brush is not in contact with the outer surface and/or a contour of the outer surface causing the deviation of the monitored angle.

The term "power consumption of the (rotating) treatment brush" is to be understood as synonymous with "power consumption of the brush drive" or "power consumption of the brush rotation drive". The same applies to the term "power loss".

In the following, the treatment brush is described as a cleaning brush, but the treatment of the vehicle is not limited to cleaning. The angle of the brush is also referred to as the angle of inclination. The term "tilt sensor" is used here to refer to a precision mechanical or electrical measuring device that establishes the exact reference to the plumb line direction for the treatment brush or monitors changes in the tilt angle. The term "type" of outer surface refers to the fact that the outer surface may be a side surface, a rear surface, a front surface, or a roof surface of the vehicle.

FIG. 1 shows, as one embodiment according to the disclosure, a device 10 for cleaning a vehicle after the vehicle has been run in, using a gantry car wash as an example.

The vehicle has at least one outer surface 12, 13, with two side surfaces 12 and a rear surface 13 shown in FIG. 1, each of which is inclined at an angle to the vertical.

In the device or apparatus 10, a frame with a traverse is provided, on which two side brushes 16 are arranged as treatment brushes, each on a suspension of a brush traversing device 18a and each rotatable about a central, longitudinally extending axis of rotation of the brush. The brush body or the bristles of the side brushes can be made of polyethylene (PE) foam, PE filaments or polypropylene (PP) felt, for example. As can be seen from FIG. 1, the side brushes are attached to the respective suspension at the upper end of their respective axis of rotation. Before the apparatus is put into operation, the side brushes 16 and their axes of rotation are vertically aligned as shown in FIG. 1. The side brushes 16 can each be moved substantially parallel to and along the side surfaces 12 with the cross member, and substantially parallel to and along the rear surface with a carriage provided on the cross member.

The suspensions of the brush traversing device 18a each comprise (not shown) a brush holder and a brush rotation drive, with which the side brush concerned can be set in rotation about its central axis of rotation. The suspensions are each provided with two actuators (not shown), for example linear actuators with pneumatic or hydraulic cylinders. The actuators can pivot the central axis of rotation of the respective side brush about a pivot axis (not shown) substantially parallel to the side surface of the vehicle and about a pivot axis (not shown) substantially parallel to the rear surface of the vehicle, in each case while providing a residual free pivotability of the cleaning brush of at least +/−1°. Further exemplary details of the suspension can be taken from DE 102104112388 A1.

The apparatus 10 further includes a device for determining the contour of the outer surfaces 12 and/or 13, which may include an image capture device, a roof brush or side brush or roof dryer tracing the contour of the vehicle, light barriers or light grids, radar or ultrasonic sensors, an input device, a database, and/or vehicle type recognition. The device for determining the contour of the outer surfaces is used for contour detection of the vehicle, which can be performed with the device of the present example at the beginning or even during the process for cleaning the vehicle. For example, the 3D contour or the height contour of the vehicle can be determined.

The apparatus 10 also has a device 18b for adjusting the angle of inclination of the side brushes 16 with respect to the vertical in at least one predetermined angular range parallel and/or perpendicular to the outer surfaces 12 and 13. In the present example, the device 18b is implemented with the above-described suspension and actuators with which the brush rotation axis can be pivoted parallel to the rear surface 13 and/or parallel to the side surfaces 12 of the vehicle.

In the apparatus 10, a means 20 is further provided for monitoring the angle of inclination of the side brushes to the vertical. In the present example, the means 20 is designed as an angle sensor which determines the angle of inclination of the respective brush or its axis of rotation to the vertical. At least one angle sensor is provided for each side brush.

The apparatus 10 further includes means for adapting the path of the side brushes 16 when the monitored angle of inclination deviates from a predetermined angular range. In the present example, the means for adapting the path of the side brushes comprises brush traversing means 18a, means 18b for adjusting the angle of inclination of the side brushes 16 with respect to the vertical, and means 20 for monitoring the angle of inclination of the side brushes with respect to the vertical. In other examples, the means 18b for adjusting the angles of inclination of the treatment brush(es) is an optional component of the means for adapting the path of the treatment brush(es). In the present example, the device for adapting comprises a data processing storage and control unit 22 which is data-conductively connected to the brush traversing device 18a, the brush rotation drive, the device 18b for adjusting the angle of the side brushes and the means 20 for monitoring the angle of the side brushes, which is adapted to store data received from these devices and which is adapted to control the cleaning process. For this purpose, a program and/or control instructions is/are implemented in the storage and control unit 22, which is/are adapted to execute and/or control a method according to one of the embodiments. The program may be implemented by a computer program product or computer program, the program elements of which cause the storage and control unit 22 and the system 10 to execute the cleaning method when the program elements are loaded into the storage and control unit 22.

Thus, through the data-conducting and data-processing networking of the brush traversing device 18a, the brush rotation drive, the device 18b for adjusting the angles of inclination of the side brushes 16 to the vertical, and the means 20 for monitoring the angles of inclination of the side brushes to the vertical, a device for control or regulation is realized, with which the path of the treatment brush can be adapted. In the present example, the paths of the side brushes 16 can be adapted. Before adaptation, the paths of the side brushes are predetermined by a spatial specification and run parallel to the side surfaces 12 and/or parallel to the rear surface 13.

In this example, the predetermined angular range is −45° to +45° to the vertical when the side brush is pivoted parallel to the treated outer surface. If the side brush 16 is pivoted towards the vehicle, the predetermined angular range in the present example is −10° to +30°, typically −5° to 30°, in the direction towards the treated external surface. As explained above, in the present example the side brushes 16 are pivotable substantially parallel to the side surfaces 12 of the vehicle and substantially parallel to the rear surface 13 of the vehicle. Therefore, starting from the vertical, the side brushes 16 can each be oriented at least partially at an angle of −10° to +30° toward the vehicle, i.e., toward the treated side surface and/or rear surface. In this case, the angle lies in a plane which is oriented substantially parallel to the side or rear surface concerned or encloses an angle of more than 0° to less than °180 with the side or rear surface.

In operation, the apparatus 10 is used to perform an embodiment of the method according to the disclosure for treating a vehicle having at least one outer surface.

In one example, the method comprises the steps of:
a) Adjusting the angles of the side brushes 16 relative to the vertical in a predetermined angular range parallel and/or perpendicular to the respective side surface 12;
b) Moving the side brushes 16 along the side surfaces 12 in one path at a time during the cleaning process;
c) Monitoring the angles of the side brushes 16 to the vertical parallel and/or perpendicular to the outer surface during step b); and
d) Adapting the path of at least one of the side brushes if a deviation of the monitored angle of the at least one side brush from the predetermined angle range is determined in step c).

Figure 2A:
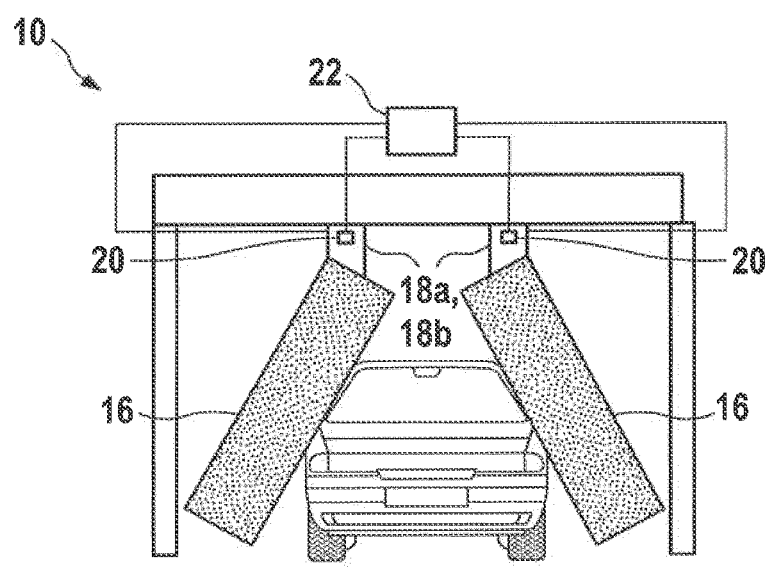
FIGS. 2A to 2C show schematically the device during steps a) to d) according to an exemplary embodiment of the process.
Figure 2B:
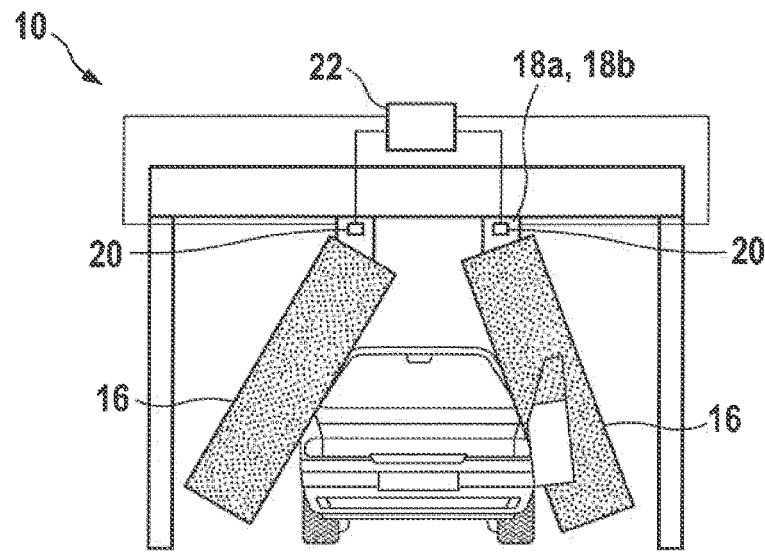
Figure 2C:
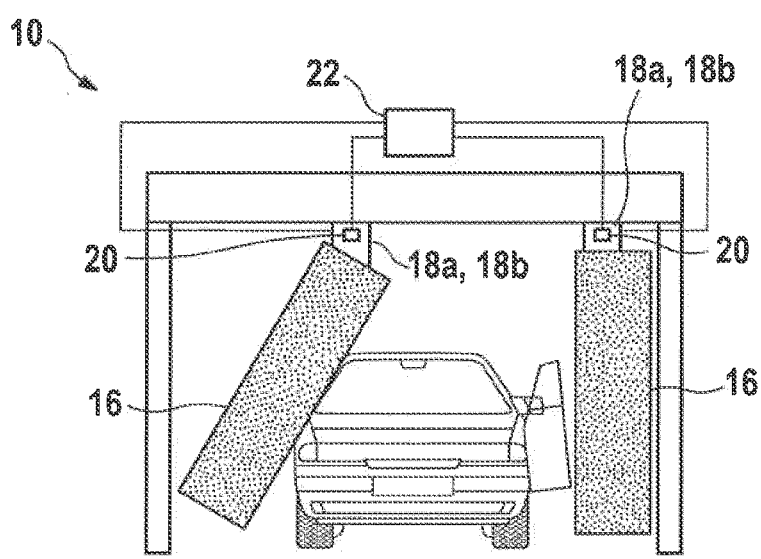

The process of the present example is now described with reference to FIGS. 1 and 2A to 2C. FIG. 1 shows the apparatus 10 with the side brushes 16 after the vehicle has been retracted. FIG. 2A to 2C depict the apparatus 10 during steps a) to d) of the method.

In the present example, the paths of the side brushes 16 are predetermined by a treatment program that is set before the treatment process begins. For this purpose, an initial contour detection of the vehicle is carried out. For this purpose, a traverse of the crosshead with, for example, a camera can be performed over the vehicle along its entire length. Alternatively or additionally, the paths of the side brushes 16 can be calculated and specified during the treatment process using sensor data from light barriers and displacement sensors.

The side brushes 16 of the apparatus 10 are set in rotation about their axis of rotation, which is shown schematically in FIG. 1. Subsequently, in step a), the angles of inclination of the side brushes 16 in the direction towards the side surfaces 12 are set to approximately 20° relative to the vertical. Thus, the inclination angles of the side brushes are each in a plane perpendicular to the side surfaces. In the present example, the angles of inclination of the side brushes 16 correspond substantially to the angles of inclination of the side surfaces 12, as can be seen from FIG. 2A. In a plan view (not shown) of the side surfaces 12, i.e., in the planes parallel to the side surfaces 12, i.e., in the present example in the direction of travel of the vehicle, the side brushes 16 are not deflected. Thereby, in both planes, a residual free pivotability of the side brushes in an angular range of +/−°1 is enabled. In the plane perpendicular to the side surfaces 12, the angular range predetermined for the tilt angle is therefore °19 to °21. In the plane parallel to the side surfaces, the angular range predetermined for the angle of inclination is +/−°1.

Then, the side brushes 16 are moved to the side surfaces 12 of the vehicle by moving the suspensions of the brush 18 traversing devices a along the traverse and, in step b), are moved along the side surfaces by moving the traverse along the predetermined paths that are substantially parallel to the side surfaces 12 as seen in the plan view of the roof surface.

During step b), i.e., while the side brushes 16 are guided along the side surfaces 12, the angles of inclination of the side brushes are continuously monitored by the means 20 for monitoring the angles of inclination of the side brushes, in the present example by the angle sensor. This corresponds to step c) of the method.

As long as the end of the side surfaces 12 has not been reached, steps b) to d) are continued and it is continuously determined (step c)) whether there is a deviation of the monitored angle of inclination of the side brushes from the predetermined angle range. A tolerance range of the angle sensor of ±3°, typically ±1° 0, can be taken into account. If the inclination angles of the side brushes are essentially within the predetermined angle range, steps b) to c) are continued until the end of the side surfaces 12 is reached.

If the angle of inclination of one or both side brushes is substantially not within the predetermined angle range, the path or paths of the side brushes are adapted in step d). This is illustrated in FIGS. 2B and 2C. Indeed, in the present example, surprisingly, a right-side door of the vehicle opens before the right-side brush reaches it. As soon as the right-side brush 16 reaches the opened side door, the right-side brush is deflected in the plane parallel to the side surface. This is detected by the means 20 for monitoring the angle of inclination of the side brush 16 in the present example within about 100 ms, and is reported to the storage and control device 22. The brush traversing device 18a simultaneously reports the position data of the unanticipated vehicle contour, i.e., the open side door. In response, the storage and control device 22 causes the brush traversing device 18a to move the right-side brush 16 away from the vehicle so that it is separated from the vehicle. Thus, there is no longer any contact between the side brush and the vehicle, including the open door, as shown in FIG. 2C. In this way, the path of the right-side brush is adapted and it is avoided that the side brush damages the side door of the vehicle. In the present example, the right-side brush 16 is additionally aligned vertically by the device 18b for setting an angle. In the present example, the time period from the start of detection of the undesired deflection of the right-side brush to the initiation of adaptation is approximately 0.3 s. Monitoring based on the angle of inclination of the treatment brush thus shows a relatively low dead time, i.e., a short period of time in which an already existing disturbance or deviation from the desired treatment process is not detected.

In a variation of the example, moreover, the rotation of the right-side brush 16 can be terminated so that penetration of cleaning fluid through the open side door into the vehicle interior is minimized.

The cleaning process is continued with the left side brush by guiding it along the left side surface 12. The right-side brush 16 continues along an adapted path while maintaining separation from the vehicle. In this way, a bypass of a contour of the outer surface causing the deviation of the monitored angle, i.e., in the present case the right-side door, is realized. As soon as the side brushes 16 have reached the end of the side surfaces 12, the cleaning process is terminated.

Alternatively or additionally, before, during or after separating the right side brush 16 from the vehicle, it can be checked whether the cleaning process can be continued with the right side brush separated. If it is determined that this is not feasible, e.g., because too much cleaning fluid would enter the vehicle interior through the open side door or because there is not enough space for the right-side brush to continue on the adapted track, the treatment process is interrupted or terminated.

As explained above, in the present example, the means 20 for monitoring the angle of the side brushes is designed as an angle sensor. In this case, the angle sensor comprises a magnet and a magnetic field sensor. Since it is a magnetic angle sensor, disturbances of the angle sensor by vibrations, temperature fluctuations, humidity or by the water pressure are minimized. In fact, when monitoring the tilt angle of the brush, the change in orientation of the magnetic field is determined. In the present example, the magnet is located away from the magnetic field sensor on the pivot axis of the respective brush. In this case, the magnet is spaced from the magnetic field sensor on the pivot axis used to set the tilt angle to be monitored, and the magnetic field sensor is provided on the suspension of the brush but not on the pivot axis. Thus, the angle sensor can monitor the tilt angle of the brush substantially continuously and with particularly high accuracy. In embodiments with multiple pivot axes per brush, an angle sensor may be provided for each pivot axis of the respective brush. It should be noted that all embodiments in which an angle sensor is used enable particularly accurate sensing and actuation, because the angle sensor is advantageously not a point sensor and also not an acceleration-based sensor. The same applies to embodiments and examples in which an inclination sensor is used in the means 20 for monitoring the angle of the side brushes.

In an analogous manner, the procedure is carried out when the right or left side brush cleans a side surface and its angle parallel and/or perpendicular to the cleaned surface is deflected, deviating from a predetermined angular range, by a sliding side door that is open or that opens during the cleaning process. In this case, as in the case of other undesirable openings of the outer surfaces to be cleaned, a monitored power consumption of the rotating side brush can be used as an additional indication of this particular vehicle contour causing a disturbance of the cleaning process. Namely, in addition to the angular deviation, a sudden drop in the power of the rotating side brush or its rotational drive is detected when the side brush no longer bears against the side surface or bears against it to a lesser extent because of the opening in the side surface caused by the open sliding door. Then the path of the side brush is adapted, e.g., by separating the side brush from the vehicle, bypassing the sliding door, stopping the rotation and/or checking the feasibility of the same as described above.

In a variation of the example of the apparatus 10 and associated method, only one side brush 16 with corresponding brush traversing device 18a may be provided or used, rather than two. In alternative examples of the method, the rotation of the side brushes 16 may also be initiated during step b). Further, the approach of the side brushes 16 to the side surfaces 12 may also be initiated prior to step a).

The present example of the apparatus 10 and the process carried out with it is described on the basis of a gantry car wash. However, the disclosure is not limited to this and can also be implemented in an analogously modified form, for example, with a car wash. For example, the device and the method according to embodiments can also be realized with a roof brush which can be guided in a car wash on a path perpendicular to the roof surface of the vehicle—with a remaining free pivotability parallel and/or perpendicular to the roof surface—while adjusting the height position of the roof brush and cleans the vehicle transported in the car wash. When the roof brush on the roof of the vehicle comes into contact with an unusual contour, e.g., a bicycle rack, its angle parallel and/or perpendicular to the roof surface is deflected away from a predetermined angular range, for example +/−85° to the vertical when the roof brush is suspended like a pendulum. The path of the roof brush is adapted by changing its height position according to step d) of the method, thus avoiding damage to the vehicle roof, the unusual contour, and the roof brush. In an analogous manner, the method is carried out when the roof brush cleans a rear surface or a front surface and its angle parallel and/or perpendicular to the cleaned surface is deflected away from a predetermined angular range by an unusual vehicle contour, such as a tailgate or hood that is open or that opens during the cleaning process.

Figure 3A:
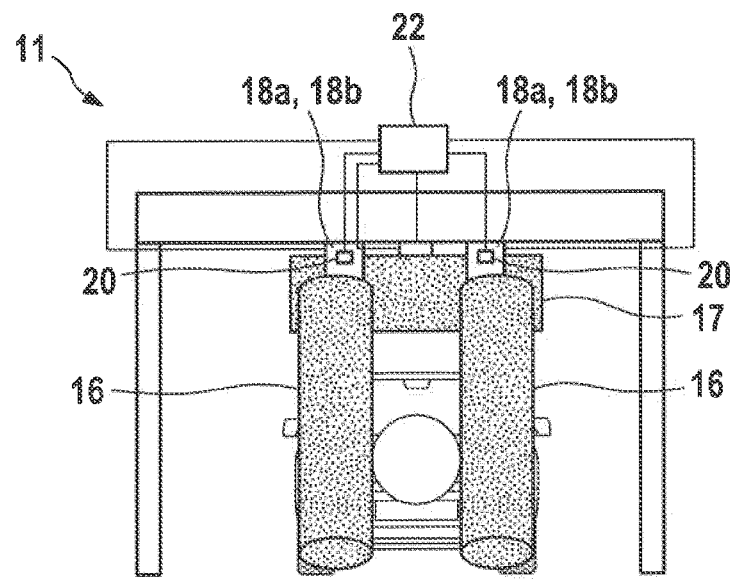
FIGS. 3A to 3C schematically show a device during steps a) to d) according to another exemplary embodiment of the method.

In another example, a device 11 with two side brushes 16 and a roof brush 17 and an associated method for cleaning the rear surface 13 are used. The device 11 corresponds to the apparatus 10, with the addition of the roof brush 17, as shown in FIG. 3A to 3D. First, the side brushes 16 are used for cleaning the rear surface 13 and steps a) to d) of the method are carried out for the rear surface 13. For this purpose, the angles of inclination of the side brushes 16 are set, for example, in accordance with an angle of inclination of the rear surface 13. This is done with the suspensions of the brush traversing device 18a, whereby the central axes of rotation of the side brushes 16 are each pivoted about the pivot axis essentially parallel to the side surfaces of the vehicle with the corresponding actuators, i.e., in the present example in the direction of travel of the vehicle. Thereby, a residual free pivotability of the side brushes of +/−°1 is provided. The predetermined angular ranges thus correspond in the present case perpendicular to the rear surface to the angle of inclination of the rear surface +/−°1 and parallel to the rear surface to the vertical +/−°1. To clean the rear surface, the rotating side brushes are fed along and onto each other starting from the end of the side surfaces 12 on the rear surface 13, which is shown in FIG. 3A.

Figure 3B:
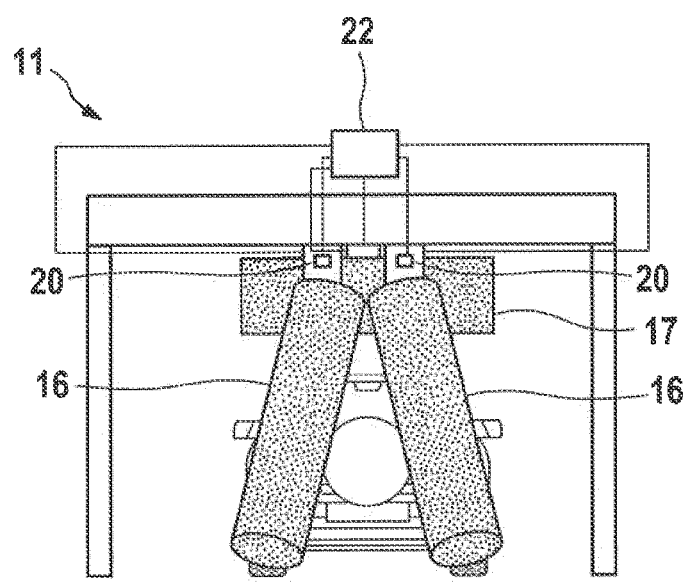
Figure 3C:
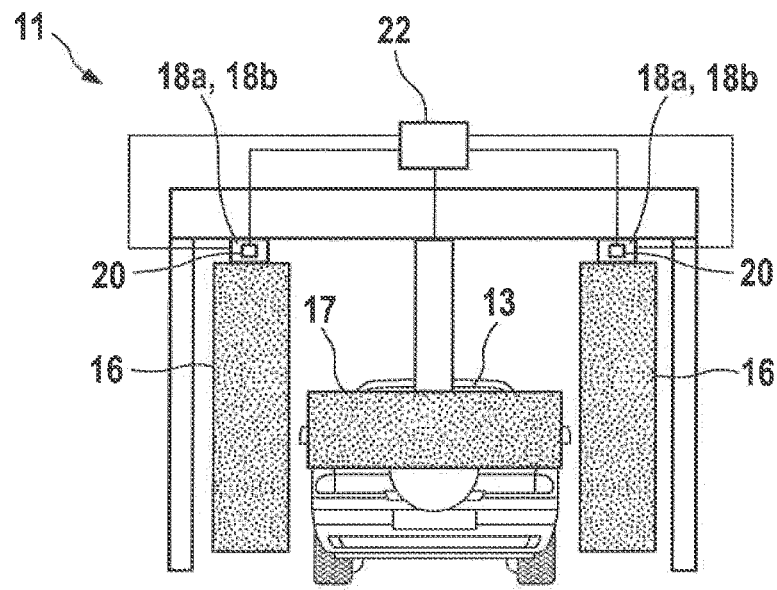

If the angle of inclination of one or both side brushes 16 is substantially not within the predetermined angle range when cleaning the rear surface 13, the path or paths of the side brushes are adapted. This is illustrated in FIGS. 3B and 3C. Indeed, in the present example, a spare wheel is provided in the center of the rear surface. As soon as the side brushes 16, which are vertically oriented in plan view of the rear surface 13, reach the spare wheel, they are deflected from 13 the vertical substantially parallel to the rear surface, as shown in FIG. 3B. This is detected by the respective means 20 for monitoring the angle of inclination of the side brushes 16 within about 100 ms in the present example, and is reported to the storage and control means 22. In response, the storage and control device 22 causes the brush traversing device 18a to laterally separate the side brushes 16 from the vehicle so that there is no contact between the side brushes and the vehicle, as shown in FIG. 3C. In this way, the path of the side brushes is adapted and it is avoided that the side brushes damage the spare wheel of the vehicle. Via the storage and control device 22, the roof brush 17 is now activated, which is guided along the rear surface 13 at such a distance therefrom that it cleans the spare wheel, which is shown in FIG. 3C. The period from the start of detection of the unwanted deflection of the side brush(es) to the initiation of adaptation is about 0.3 s in the present example. Monitoring based on the angle of inclination of the treatment brush thus shows a relatively low dead time, i.e., a short period during which an already existing disturbance or deviation from the desired treatment process is not detected.

Figure 3D:
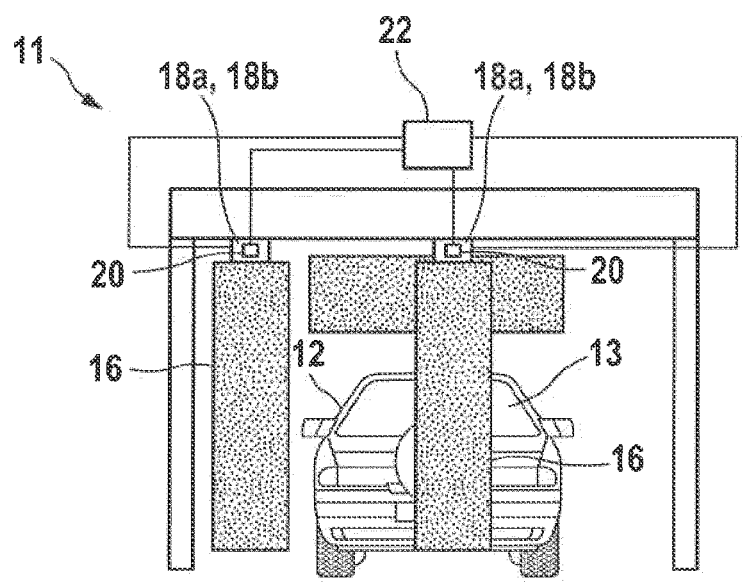
FIG. 3D shows schematically the device during an alternative step d) according to the other exemplary embodiment of the method.

In a variation of the step of FIG. 3C, one of the side brushes, e.g., the right side brush 16, cannot be separated from the vehicle, but instead of the roof brush 17 can be guided along the rear surface 13 at such a distance therefrom that it cleans the spare wheel. This is shown in FIG. 3D. In this case, the side brush is oriented parallel and perpendicular to the rear surface in a substantially vertical direction. Alternatively, the side brush can be oriented at an angle inclined toward the rear surface 13. In this way, a bypassing of a contour of the rear surface causing the deviation of the monitored angle, i.e., in the present case of the spare wheel, is realized for the side brush 16 in such a way that the side brush 16 continues to be in contact with the vehicle, in this case with the spare wheel, and cleans the bypassed contour of the vehicle. The cleaning with the roof brush 17 described with reference to FIG. 3C can be carried out additionally.

Further, in variations of the above example of FIG. 3A to 3D, when the spare wheel is provided to the right or left of the center of the rear surface 13, only that side brush 16 is deflected from the predetermined angular range which reaches the spare wheel first. Then the path of the side brush deflected first is adapted by driving around the spare wheel with this side brush and cleaning the spare wheel as described above. Alternatively, the path can be adapted by separating the first deflected side brush or both side brushes from the vehicle and cleaning the spare wheel with the roof brush 17 as described above. In an additional variation, the other side brush 16 is continued on the rear surface 13 until it too is deflected on the spare wheel from the predetermined angular range parallel to the rear surface 13. In this way, the exact position and dimension of the spare wheel can also be determined with the brush traversing devices 18a of the two side brushes. Subsequently, the spare wheel can be cleaned (again) with one of the two side brushes 16 by moving around it and/or with the roof brush 17 as described above.

In the above example, instead of the spare wheel on the rear surface, an open tailgate or a bicycle holder that is opened during the cleaning process can cause the monitored angle of the side brush to deviate from the predetermined angle range. The described procedure is then carried out analogously and the path of the side brush is adapted to avoid damage to the vehicle.

The steps shown in FIGS. 3A, 3B, and 3D can also be carried out with the device 10 without a roof brush. According to further examples, the side brushes can be used to clean first the side surfaces and then a rear surface adjacent thereto. For this purpose, the examples explained with reference to the devices 10 and 11 can be combined. Alternatively, the rear surface can be cleaned first and then side surfaces adjacent thereto.

In further variations of the foregoing examples, the apparatuses 10 and 11 and associated methods may analogously include or employ at least one tail brush for cleaning the tail surface 13. The tail brush may exclusively clean the tail surface 13. The rear brush can be provided, for example, vertically aligned on another cross-member of the washing gantry separate from the side brushes, and guided therealong parallel to the rear surface 13 by a carriage arranged on the associated cross-member. At least one rear brush for cleaning the rear surface 13 and/or at least one front brush for cleaning the front surface of the vehicle can also be provided analogously in a car wash.

It is understood that the suspension of the brush traversing device 18a of the respective cleaning brush(es) can be designed in a modified manner for the above-described cases of cleaning only the side surfaces and cleaning only the rear surface. If only one or two side surfaces are cleaned, a swivel axis and an actuator can suffice for the brush suspension in each case, with which the central axis of rotation of the brush can be swiveled essentially parallel to the rear surface of the vehicle. In the case of a rear brush that cleans only the rear surface, a pivot axis and actuator may be provided by which the central axis of rotation of the brush can be pivoted substantially parallel to the side surface of the vehicle. Further, in alternative embodiments of the apparatus and method, other suspensions of the cleaning brushes may be provided. For example, at least one of the cleaning brushes may be freely oscillatingly suspended from the upper end of the brush axis, in particular from a cantilever arm at the upper end of the brush axis or from two cantilever arms at the upper and lower ends of the brush axis. In this case, the angle of inclination of the brush can be adjusted via the cantilever arm or arms while supporting the brush on the respective outer surface of the vehicle to be cleaned.

In another embodiment of the method, during an initial contour detection, as mentioned above, the height of the vehicle can be determined and an upper and lower limit of the predetermined angular range parallel and/or perpendicular to the outer surfaces can be derived therefrom.

As can be seen from the above examples, the path of the treatment brush is adapted when a deviation of the monitored angle of the treatment brush from the predetermined angle range is determined in step c) of the method. Thus, embodiments of the apparatus and method allow the path of the treatment brush(es) along the outer surfaces to be automatically adapted to the entire outer contour of the vehicle, i.e., also to unusual or unexpected contours of the outer surfaces. This results in particularly thorough cleaning of the vehicle and high operational reliability. In this way, unusual and undesirable situations during vehicle treatment can also be automatically detected, e.g., with sensor values from angle or inclination sensors and optionally by any combination with sensor values from light barriers, power measurement and displacement sensors, and adjustments to the program sequence can be automatically initiated. The sequences adapted adaptively to the respective situation can be carried out until the device for treating the vehicle can return to normal control operation or falls into a malfunction state after a certain number of adaptation attempts or a maximum time has been exceeded.

For example, if the treatment brush becomes caught on an attachment of the vehicle while treating an outer surface, the brush is unexpectedly deflected out of the predetermined angular range. Instead of simply continuing to treat or going directly into an error mode, the vehicle treatment device resets the brush against the desired angle of inclination in the predetermined angular range and attempts to treat the area of the add-on part again. Alternatively, the area of the add-on part is bypassed. For example, a spare wheel unexpectedly present on the rear surface of a vehicle and its surroundings can still be treated. The information generated by the process about the add-on part, e.g., its position and/or size, can be stored in the system and can also be used in subsequent processes such as chemical application, drying, etc. Other units can be activated in deviation from the normal treatment process to collect additional information, e.g., a light barrier of a roof dryer for a length measurement.

Furthermore, during and/or before carrying out the adaptation of the path of the treatment brush, the feasibility of the same can be checked. If, for example, during the treatment of an external surface, the treatment brush gets caught with its brush material on an add-on part (e.g., trailer coupling) of the vehicle, and the brush is unexpectedly deflected from the predetermined angular range, the brush can, for example, be set in rotation in the opposite direction in order to adapt its path. This can allow the brush material to detach from the attachment again. In addition, before the direction of rotation of the brush is changed, the feasibility of this measure of adaptation can be tested.

In one example of checking the feasibility of a step in the adaptation process, sensor data, e.g., from light barriers, can be used to check whether there is sufficient space for further operation of the brush during adaptation. If this check reveals that there is not enough space for the brush to adapt, the treatment process is interrupted or terminated. In an alternative example of feasibility testing, during and/or prior to adapting the path of the brush, it is possible to check whether the brush drive is operating at its power limit by measuring the power of the brush drive. If this is the case, the treatment process is interrupted or terminated. In addition, the sensitivity of the measurement can be increased for measuring the power of the brush drive.

Finally, it should be noted that the description of the disclosure and the embodiments are in principle not to be understood restrictively with respect to any particular physical realization of the disclosure. All features explained and shown in connection with individual embodiments of the disclosure may be provided in different combinations in the subject matter according to the disclosure in order to simultaneously realize their advantageous effects.

The scope of protection of the present disclosure is given by the claims and is not limited by the features explained in the description or shown in the figures.

In particular, it is obvious to a person skilled in the art that the disclosure can be applied not only to vehicle treatment installations, but also to other installations for the treatment, e.g., cleaning, of objects, for example aircraft. Furthermore, the apparatus 10, 11 can be realized distributed on several physical devices.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS 10, 11 Apparatus for treating a vehicle with at least one outer surface
12 Side face
13 Rear surface
16 Side brush
17 Roof brush
18a Brush traverser
18b Device for setting an angle of the treatment brush relative to the vertical
20 Means for monitoring the angle of the cleaning brush
22 Control

What is claimed is:

1. A method for treating a vehicle having at least one outer surface with an apparatus including at least two treatment brushes configured to be guided along a path on the at least one outer surface, the method comprising:
   (a) adjusting an angle of a treatment brush of the at least two treatment brushes, in particular a rotating treatment brush, relative to a vertical, in at least one predetermined angular range at least one of parallel and perpendicular to the outer surface;
   (b) guiding the treatment brush along the at least one outer surface on a path during the treatment process;
   (c) monitoring the angle of the treatment brush to the vertical at least one of parallel and perpendicular to the outer surface during step (b); and
   (d) adapting the path of the treatment brush if a deviation of the monitored angle of the treatment brush from the at least one predetermined angle range is determined in step (c), wherein adapting the path comprises separating the treatment brush from the vehicle, and wherein separating the treatment brush is only performed for the treatment brush of the at least two treatment brushes for which the deviation of the monitored angle is determined.

2. The method according to claim 1, wherein adapting the path comprises at least one of:
   (i) repeating at least one of steps (a) to (d);
   (ii) repeating at least one of steps (a) to (d) with a modified distance of the treatment brush to the outer surface;
   (iii) repeating at least one of steps (a) to (d) with a modified angle of the treatment brush to the vertical at least one of parallel and perpendicular to the outer surface;
   (iv) repeating at least step (b) from steps (a) to (d), wherein in step (b) a change of direction is made during the guiding;
   (v) bypassing a contour of the outer surface causing the deviation of the monitored angle;
   (vi) increasing the distance of the treatment brush from the outer surface;
   (vii) terminating a rotation of the treatment brush;
   (viii) treating a contour of the outer surface causing the deviation of the monitored angle with at least one other treatment brush;
   (ix) changing the direction of rotation of the treatment brush;
   (x) varying the sensitivity of the power measurement, in particular increasing the sensitivity of the power measurement; and
   (xi) checking the feasibility of at least one of steps (i) to (xi) and interrupting or terminating the treatment process if it is determined that the at least one step (i) to (xi) is not feasible.

3. The method according to claim 1, wherein the treatment brush is guided along the at least one outer surface on one or more adapted paths until at least one of the following conditions is met:
   the monitored angle of the treatment brush is in the at least one predetermined angular range;
   the path of the treatment brush has been adapted a predetermined number of times; and the treatment brush has been guided along the outer surface on one or more adapted paths for a predetermined time.

4. The method according to claim 1, wherein at least one of:
the at least one outer surface is selected from a side surface, a rear surface, a front surface, a roof surface, any combination thereof, and any number thereof, and the at least one predetermined angular range is limited by at least one of an upper limit value and a lower limit value which varies depending on the type of outer surface,
the at least one outer surface is selected from a side surface, a rear surface, a front surface, any combination thereof, and any number thereof, and the at least one predetermined angular range is limited by at least one of an upper limit value and a lower limit value that varies depending on the height of the outer surface,
the at least one outer surface is selected from a side surface, a rear surface, a front surface, any combination thereof and any number thereof, and the at least one predetermined angular range is −45° to +45° to the vertical, in particular in the direction towards the outer surface typically −10° to +30° to the vertical, more typically −5° to +30° to the vertical,
the at least one outer surface is a roof surface and the at least one predetermined angular range is −85° to +85°, typically −80° to +80 to the vertical, and
step (c) is carried out with an angle sensor or an inclination sensor.

5. The method according to claim 4, wherein at least one of:
the angle sensor comprises a magnet and a magnetic field sensor, and
in step (c) a change in orientation of the magnetic field of a magnet is determined.

6. The method according to claim 1, wherein at least one of:
at least one of the contour and a position of the outer surface is determined, and
the treatment brush rotates and step c) comprises at least one step selected from: monitoring the power consumption of the rotating treatment brush; and monitoring the rotation of the rotating treatment brush.

7. An apparatus for treating a vehicle with a method according to claim 1, the vehicle having at least one outer surface, the apparatus comprising:
the at least two treatment brushes which can be guided along a path on the at least one outer surface;
a brush traversing device for guiding the at least two treatment brushes along the outer surface to be treated on the path;
means for adjusting an angle of the treatment brush of the at least two treatment brushes relative to the vertical in at least one predetermined angular range at least one of parallel and perpendicular to the outer surface;
means for monitoring the angle of the treatment brush relative to the vertical at least one of parallel and perpendicular to the outer surface during the treatment process; and
a device for adapting the path of the treatment brush when the monitored angle of the treatment brush deviates from the at least one predetermined angular range.

8. The apparatus of claim 7, wherein at least one of:
the treatment brush is rotatably supported and the apparatus comprises a brush rotation drive, and
the means for adapting the path of the treatment brush comprises a data processing storage and control unit which is connected in a data-conducting manner to at least one device selected from the brush traversing device, the brush rotation drive, the means for adjusting an angle of the treatment brush and the means for monitoring the angle of the treatment brush, which is configured to store data received from these devices.

9. The apparatus according to claim 7, wherein at least one of:
at least one element selected from said treatment brush, said brush traversing device and said brush rotation drive is controllable with said means for adapting the trajectory of said treatment brush, and
a program is implemented in the means for adapting the path of the treatment brush, wherein the program is configured to cause the apparatus to:
(a) adjust an angle of a treatment brush, in particular a rotating treatment brush, relative to the vertical in at least one predetermined angular range at least one of parallel and perpendicular to the outer surface;
(b) guide the treatment brush along the at least one outer surface on a path during the treatment process;
(c) monitor the angle of the treatment brush to the vertical at least one of parallel and perpendicular to the outer surface during step (b); and
(d) adapt the path of the treatment brush if a deviation of the monitored angle of the treatment brush from the at least one predetermined angle range is determined in step (c).

10. The apparatus according to claim 7, wherein at least one of:
the at least one outer surface is selected from a side surface, a rear surface, a front surface, a roof surface, any combination thereof, and any number thereof, and the at least one predetermined angular range is bounded by at least one of an upper limit value and a lower limit value that varies depending on the type of outer surface,
the at least one outer surface is selected from a side surface, a rear surface, a front surface, any combination thereof, and any number thereof, and the at least one predetermined angular range is limited by at least one of an upper limit value and a lower limit value that varies depending on the height of the outer surface,
the at least one outer surface is selected from a side surface, a rear surface, a front surface, any combination thereof and any number thereof, and the at least one predetermined angular range is −45° to +45° to the vertical, in particular in the direction towards the outer surface typically −10° to +30° to the vertical, more typically −5° to +30° to the vertical, and
the at least one outer surface is a roof surface and the at least one predetermined angular range is −85° to +85°, typically −80° to +80 to the vertical.

11. The apparatus according to claim 7, wherein the means for monitoring the angle of the treatment brush comprises an angle sensor or a tilt sensor.

12. Apparatus according to claim 11, wherein at least one of:
the angle sensor comprises a magnet and a magnetic field sensor, and
the angle sensor is configured to detect a change in orientation of the magnetic field of a magnet.

13. The apparatus according to claim 7, further comprising at least one of:
means for monitoring the power consumption of the rotating treatment brush;

means for monitoring the rotation of the rotating treatment brush; and means for determining the contour and/or position of the outer surface.

14. The apparatus according to claim 7, configured to:
   (a) adjust an angle of a treatment brush, in particular a rotating treatment brush, relative to the vertical in at least one predetermined angular range at least one of parallel and perpendicular to the outer surface;
   (b) guide the treatment brush along the at least one outer surface on a path during the treatment process;
   (c) monitor the angle of the treatment brush to the vertical at least one of parallel and perpendicular to the outer surface during step (b); and
   (d) adapt the path of the treatment brush if a deviation of the monitored angle of the treatment brush from the at least one predetermined angle range is determined in step (c).

15. A non-transitory computer-readable storage medium on which a computer program is stored, the computer program comprising program elements which cause at least one of an execution unit, a vehicle treatment system, and an apparatus according to claim 7, to:
   (a) adjust an angle of the treatment brush of the at least two treatment brushes relative to the vertical in at least one predetermined angular range at least one of parallel and perpendicular to the outer surface;
   (b) guide the treatment brush along the at least one outer surface on a path during the treatment process;
   (c) monitor the angle of the treatment brush to the vertical at least one of parallel and perpendicular to the outer surface during step (b); and
   (d) adapt the path of the treatment brush if a deviation of the monitored angle of the treatment brush from the at least one predetermined angle range is determined in step (c), wherein adapting the path comprises separating the treatment brush from the vehicle, and wherein separating the treatment brush is only performed for the treatment brush for which the deviation of the monitored angle is determined, when the program elements are loaded into a memory of the execution unit or into a memory of a server or computer in data-conducting connection with the execution unit.

16. The method according to claim 1, wherein the treatment brush of the at least two treatment brushes is at least one of a side brush, a roof brush, a rear/tail brush, and a front brush.

* * * * *